United States Patent
He et al.

(10) Patent No.: US 10,997,691 B2
(45) Date of Patent: May 4, 2021

(54) METHOD AND DEVICE FOR INTERPOLATING IMAGE

(71) Applicant: Montage LZ Technologies (Chengdu) Co., Ltd., Chengdu (CN)

(72) Inventors: Mengchi He, Chengdu (CN); Binxuan Sun, Chengdu (CN); Ke Wu, Chengdu (CN); Chia Chen Chang, Chengdu (CN)

(73) Assignee: MONTAGE LZ TECHNOLOGIES (CHENGDU) CO., LTD., Chengdu (CN)

( * ) Notice: Subject to any disclaimer, the term of this patent is extended or adjusted under 35 U.S.C. 154(b) by 162 days.

(21) Appl. No.: 16/232,078

(22) Filed: Dec. 26, 2018

(65) Prior Publication Data
US 2019/0206024 A1 Jul. 4, 2019

(30) Foreign Application Priority Data

Dec. 29, 2017 (CN) .......................... 201711473491.1

(51) Int. Cl.
*G06T 3/40* (2006.01)
*G06T 7/13* (2017.01)

(52) U.S. Cl.
CPC ............ *G06T 3/403* (2013.01); *G06T 3/4007* (2013.01); *G06T 7/13* (2017.01)

(58) Field of Classification Search
CPC ......... G06T 3/403; G06T 7/13; G06T 3/4007; G06T 2200/12

USPC ........................................................ 382/286
See application file for complete search history.

(56) References Cited

U.S. PATENT DOCUMENTS

| | | | |
|---|---|---|---|
| 5,329,614 A * | 7/1994 | Kidd ..................... | G06T 3/4023 345/671 |
| 2007/0153106 A1* | 7/2007 | Subbotin ............... | G06T 3/4015 348/272 |
| 2017/0256030 A1* | 9/2017 | Kurita .................... | H04N 1/387 |

FOREIGN PATENT DOCUMENTS

KR 101192402 B1 * 10/2012

* cited by examiner

*Primary Examiner* — Amandeep Saini
(74) *Attorney, Agent, or Firm* — Jun He Law Offices P.C.; James J. Zhu

(57) ABSTRACT

The present application discloses a method of interpolating an image including a pixel array formed of multiple pixels. The method includes: determining a position of an interpolation point relative to the pixel array; determining weights of an edge direction of the pixel array at the position of the interpolation point in a plurality of preset edge directions based on pixel values of a plurality of pixels adjacent to the interpolation point; selecting, for each preset edge direction, one or more corresponding pixel sub-arrays covering the interpolation point from the pixel array to calculate an interpolation pixel value of the interpolation point; calculating a weighted interpolation pixel value of the interpolation point based on the weights of the edge direction of the pixel array at the position of the interpolation point in the preset edge directions and the interpolation pixel value of the interpolation point corresponding to each preset edge direction.

12 Claims, 7 Drawing Sheets

(a)

(b)

(c)

(d)

(e)

(a)

(b)

METHOD AND DEVICE FOR INTERPOLATING IMAGE

CROSS REFERENCE TO RELATED APPLICATIONS

This application claims priority to Chinese patent application No. 201711473491.1 filed on Dec. 29, 2017, the entire content of which is incorporated herein by reference.

TECHNICAL FIELD

The present application relates to the field of image processing, and in particular, to a method and a device for interpolating an image.

BACKGROUND

In displays of mobile phones, tablet computers, computers or digital televisions, image scaling algorithms are often used to process images. For example, in the process of enlarging an image, an interpolation algorithm is needed to calculate missing pixels of the enlarged image.

The interpolation algorithms widely used in the prior art include nearest neighbor algorithm, bilinear interpolation algorithm, cubic interpolation algorithm, etc., but images enlarged with these algorithms have obvious jaggies.

SUMMARY

The present application provides a method and a device for interpolating an image that can reduce jaggies and artificial traces when enlarging images.

In one aspect of the application, a method for interpolating an image is provided, and the image includes a pixel array formed of multiple pixels. The method includes: determining a position of an interpolation point relative to the pixel array; determining weights of an edge direction of the pixel array at the position of the interpolation point in a plurality of preset edge directions based on pixel values of a plurality of pixels adjacent to the interpolation point; selecting, for each of the plurality of preset edge directions, one or more corresponding pixel sub-arrays covering the interpolation point from the pixel array to calculate an interpolation pixel value of the interpolation point; and calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions.

In the other aspect of the application, a device for interpolating an image is also provided, and the image includes a pixel array formed of multiple pixels. The device includes: a processor; a memory stores program instructions that are executable on the processor, and when executed on the processor, the program instructions cause the processor: determining a position of an interpolation point relative to the pixel array; determining weights of an edge direction of the pixel array at the position of the interpolation point in a plurality of preset edge directions based on pixel values of a plurality of pixels adjacent to the interpolation point; selecting, for each of the plurality of preset edge directions, one or more corresponding pixel sub-arrays covering the interpolation point from the pixel array to calculate an interpolation pixel value of the interpolation point; and calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions.

The foregoing is a summary of the present application and may be simplified, summarized, or omitted in detail, so that a person skilled in the art shall recognize that this section is merely illustrative and is not intended to limit the scope of the application in any way. This summary is neither intended to define key features or essential features of the claimed subject matter, nor intended to be used as an aid in determining the scope of the claimed subject matter.

BRIEF DESCRIPTION OF THE DRAWINGS

The abovementioned and other features of the present application will be more fully understood from the following specification and the appended claims, taken in conjunction with the drawings. It can be understood that these drawings depict several embodiments of the present application and therefore should not be considered as limiting the scope of the present application. By applying the drawings, the present application will be described more clearly and in detail.

DETAILED DESCRIPTION

Figure 1:
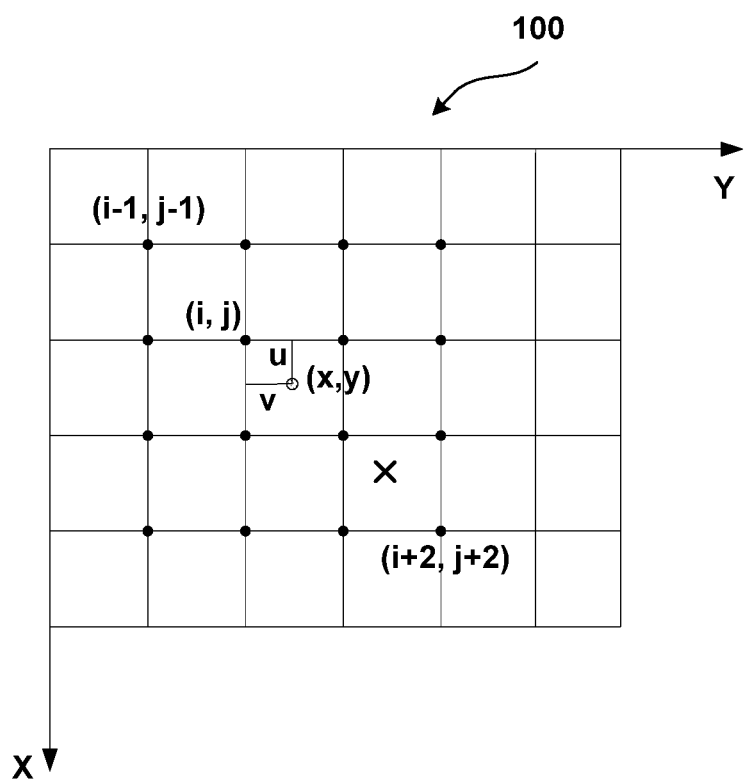
FIG. 1 shows a pixel array 100 formed of pixels of an image.

The following detailed description refers to the drawings that form a part hereof. In the drawings, similar symbols generally identify similar components, unless context dictates otherwise. The illustrative embodiments described in the description, drawings, and claims are not intended to limit. Other embodiments may be utilized and other changes may be made without departing from the spirit or scope of the subject matter of the present application. It can be understood that numerous different configurations, alternatives, combinations and designs may be made to various aspects of the present application which are generally described and illustrated in the drawings in the application, and that all of which are expressly formed as part of the application.

First, a polyphase interpolation algorithm is described in conjunction with FIG. 1. FIG. 1 illustrates a pixel array 100 formed of pixels of an image, and each intersection point of the lines in the x-axis and y-axis directions represents an original or existing pixel of the image. The intersection point in coordinate (i, j) represents the existing pixel with coordinates i and j (i.e., a pixel (i, j)), which is represented by a dot in FIG. 1. Coordinate (x, y) represents a position of a pixel to be interpolated (i.e., a position of an interpolation point), which is represented by a circle in FIG. 1. A horizontal distance between the interpolation point and the pixel (i, j) is v, and a vertical distance therebetween is u. In the example shown in FIG. 1, pixel values of the interpolation point are calculated using 4×4 existing pixels as inputs. In particular, the coordinate of the position of the current interpolation point is represented by (i+u, j+v), and the interpolation result f (i+u, j+v) can be calculated using the following Equation (1):

$$f(i+u, j+v) = [A] \times [B] \times [C] = [S(u+1) S(u+0) S(u-1) S(u-2)] *$$
$$\begin{bmatrix} f(i-1, j-1) & f(i-1, j+0) & f(i-1, j+1) & f(i-1, j+2) \\ f(i+0, j-1) & f(i+0, j+0) & f(i+0, j+1) & f(i+0, j+2) \\ f(i+1, j-1) & f(i+1, j+0) & f(i+1, j+1) & f(i+1, j+2) \\ f(i+2, j-1) & f(i+2, j+0) & f(i+2, j+1) & f(i+2, j+2) \end{bmatrix} * \begin{bmatrix} S(v+1) \\ S(v+0) \\ S(v-1) \\ S(v-2) \end{bmatrix}$$

Equation (1)

wherein Matrix [B] represents pixel values of the input 4×4 existing pixels, and Matrices [A] and [C] represent weights of all existing pixel in the horizontal and vertical directions, respectively. Multiplying the three matrices is equivalent to multiplying each pixel value in Matrix [B] by corresponding weights in both horizontal and vertical directions and then adding up the products. For example, for the pixel (i, j), its distances to the position of the interpolation point in both directions are u and v, respectively, so that its pixel value is multiplied by weight coefficients S (u+0) and S (v+0). Correspondingly, the weights corresponding to the pixel value of pixel (i−1, j−1) are S (u+1) and S (v+1), and so on. Function S(x) is a kernel function of polyphase interpolation algorithm, which is used to calculate corresponding weights according to the distance from each existing pixel to the position of the interpolation point. The following Equation (2) gives an example of the kernel function S(x). Different kernel functions may be used in different application scenarios, but the basic idea is that the closer the existing pixel is to the interpolation point, the greater the weight is.

$$S(x) = \begin{cases} 1 - 2|x|^2 + |x|^3 & (0 \le |x| < 1) \\ 4 - 8|x| + 5|x|^2 - |x|^3 & (1 \le |x| < 2) \\ 0 & (|x| \ge 2) \end{cases}$$

Equation (2)

The inventors of the present application have found that, compared with the nearest neighbor method and the bilinear interpolation method, the above-mentioned polyphase interpolation algorithm uses more pixels around the interpolation point as input, and thus can reduce jaggies in the enlarged image. However, even enlarged with the polyphase interpolation algorithm, significant jaggies still can be seen when the magnification is large. Although it is possible to ameliorate jaggies by blurring the edges using different kernel functions, there is a trade-off between jaggies and clarity of the image. In addition, some edge-detection based algorithms may choose different interpolation algorithms by detecting edge directions of the input image to reduce jaggies. For example, edge directions in an image may be detected by using Canny operator, and an output image may be obtained by using the bilinear interpolation method or other methods according to the detection result. However, the Canny operator is computationally complex, and it is difficult to obtain accurate results in complicated regions of the image. In addition, the bilinear interpolation based on edge directions can only double the size of the image at one time, and requires enlarging multiple times when the magnification is large.

In view of the above, the present application provides an interpolation method for combining interpolation results of different pixel sub-arrays by detecting edge directions in the image. Instead of trying to calculate an accurate edge direction, the method can calculate proximity degree of an edge direction of the image at the position of the interpolation point to all edges in a plurality of preset edge directions, so as to avoid the distortion of the output image caused from edge detection errors. In addition, the method uses a plurality of different pixel sub-arrays to calculate a plurality of interpolation pixel values at the position of each interpolation point and combine the plurality of interpolation results based on edge detect result, instead of finding an optimal sub-array for the position of each interpolation point to obtain the interpolation result or using different interpolation algorithms for the same pixel sub-array. Thus, artificial traces produced in the region of the image where the edge changes sharply can be avoided.

Figure 2:
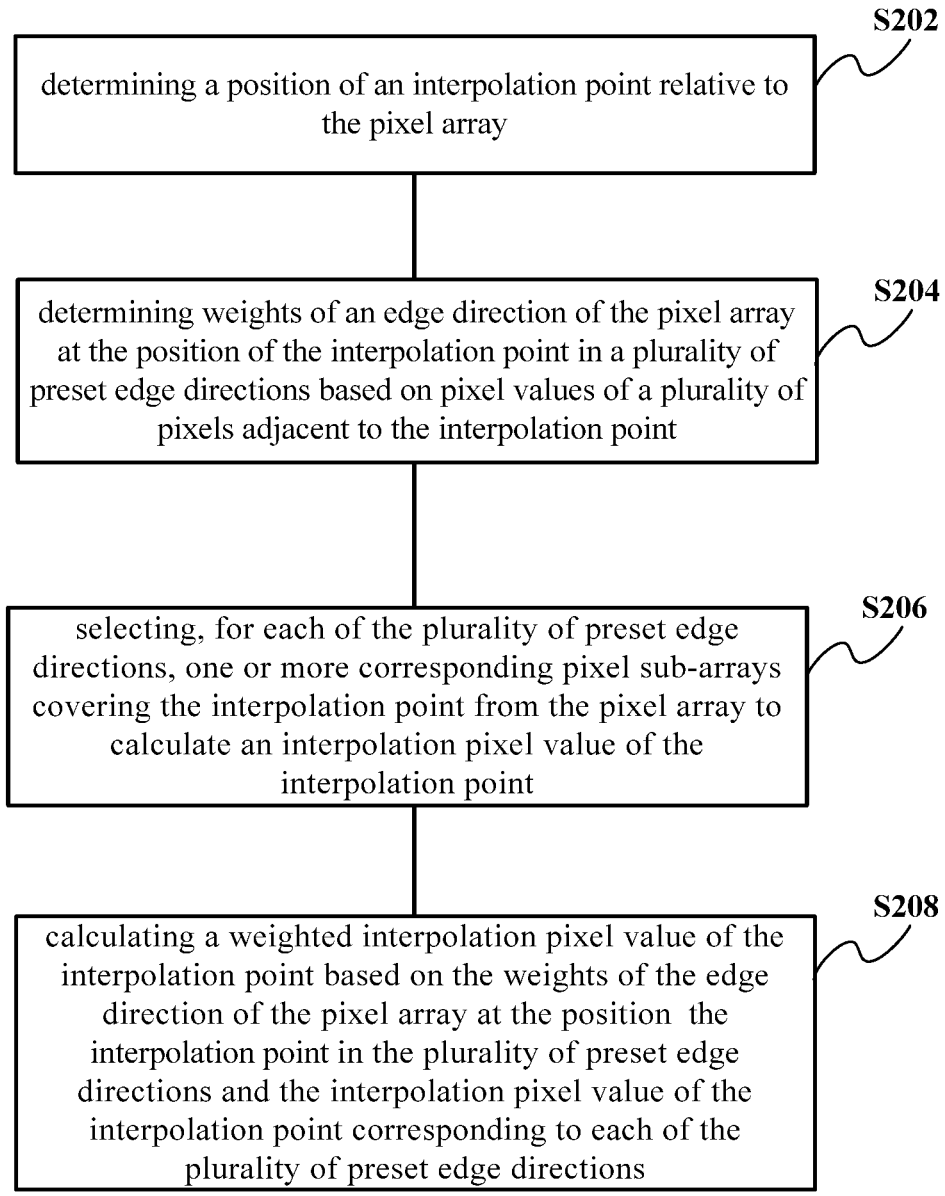
FIG. 2 is a flow chart of a method for interpolating an image according to an embodiment of the present application.

A method for image interpolation will be described in detail below according to an embodiment of the present application with reference to FIG. 2. FIG. 2 is a flow chart of a method for image interpolation according to an embodiment of the application, and the method can calculate the interpolation value during scaling an image.

Figure 3:
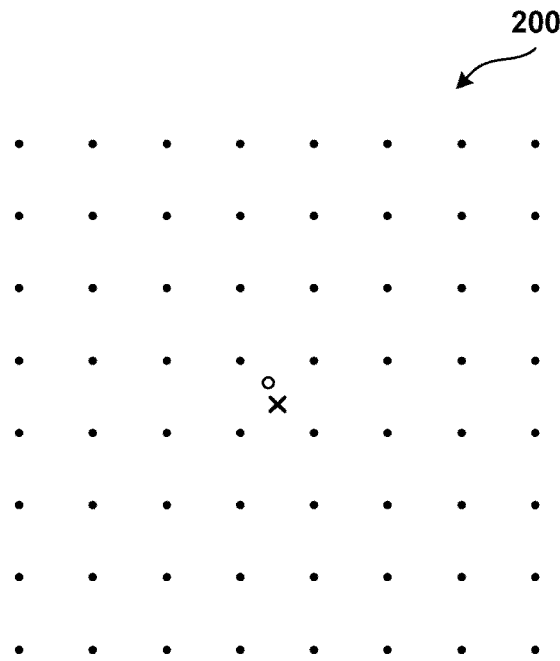
FIG. 3 shows a pixel array 200 according to an embodiment of the present application.

FIG. 3 shows an image 200 that needs to be enlarged according to an embodiment of the application. As shown in FIG. 3, the image 200 is a two-dimensional bitmap image and includes a pixel array formed of multiple pixels represented by dots, and each pixel has a specific position. The image 200 may be a grayscale image or a color image encoded in RGB, CMYK or other suitable encoding format, and each pixel has a particular grayscale value or color channel values.

In some embodiments, image 200 shown in FIG. 3 may be interpolated using the method for image interpolation shown in FIG. 2. In the following description, unless otherwise specified, the pixel value indicates the grayscale value or each color channel value, and no further distinction will be made. A person skilled in the art should understand that, when interpolating a color image, the interpolation operation needs to be performed for each color channel separately.

As shown in FIG. 2, in step S202, a position of an interpolation point relative to the pixel array is determined.

In the process of enlarging a two-dimensional image, it is usually required to interpolate the image in the horizontal direction and the vertical direction. For example, in order to enlarge an image with a 360×640 pixel array to a 720×1280 pixel array, it is needed to respectively insert additional 360 rows of pixels in the horizontal direction and additional 640 columns of pixels in the vertical direction into the image. That is, these additional pixels are inserted into the positions having no original pixel to form a new image. Therefore, when determining the position of interpolation point relative to the pixel array, it is required to consider both the magnification of the image and the processing order of the interpolation processing in each row and each column. Taking FIG. 3 as an example, a point X in the image 200 is determined as the position of the current interpolation point, which is represented by a circle.

Next, in step S204, weights of an edge direction of the pixel array at the position of the interpolation point in a plurality of preset edge directions are determined based on pixel values of a plurality of pixels adjacent to the interpolation point.

In step S204, the weights of the edge direction of the pixel array at the position of the interpolation point in the plurality of preset edge directions are determined based on the pixel values of the plurality of pixels adjacent to the current interpolation point, rather than an accurate edge direction angle is determined, thereby reducing or avoiding the image distortion caused by edge detection errors.

Figure 4:
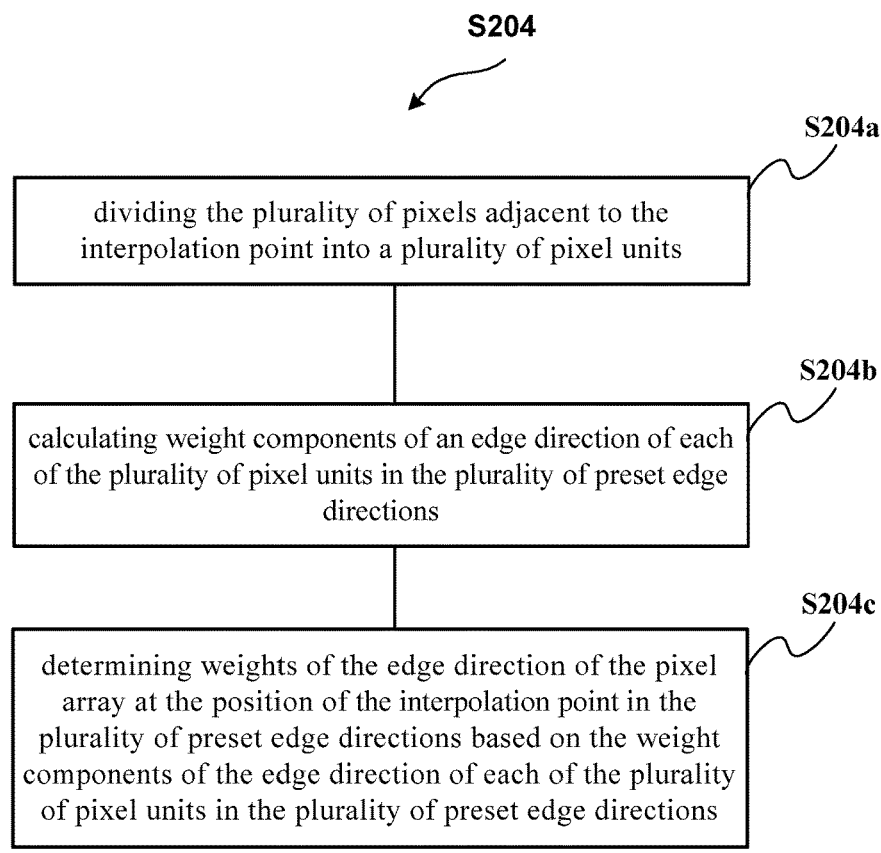
FIG. 4 is a flow chart for determining weights of an edge direction of a pixel array at a position of an interpolation point in a plurality of preset edge directions according to an embodiment of the present application.

In some embodiments, as shown in FIG. 4, step S204 includes sub-steps S204a-S204c.

In particular, in step S204a, the plurality of pixels adjacent to the interpolation point are divided into a plurality of pixel units.

Figure 5:
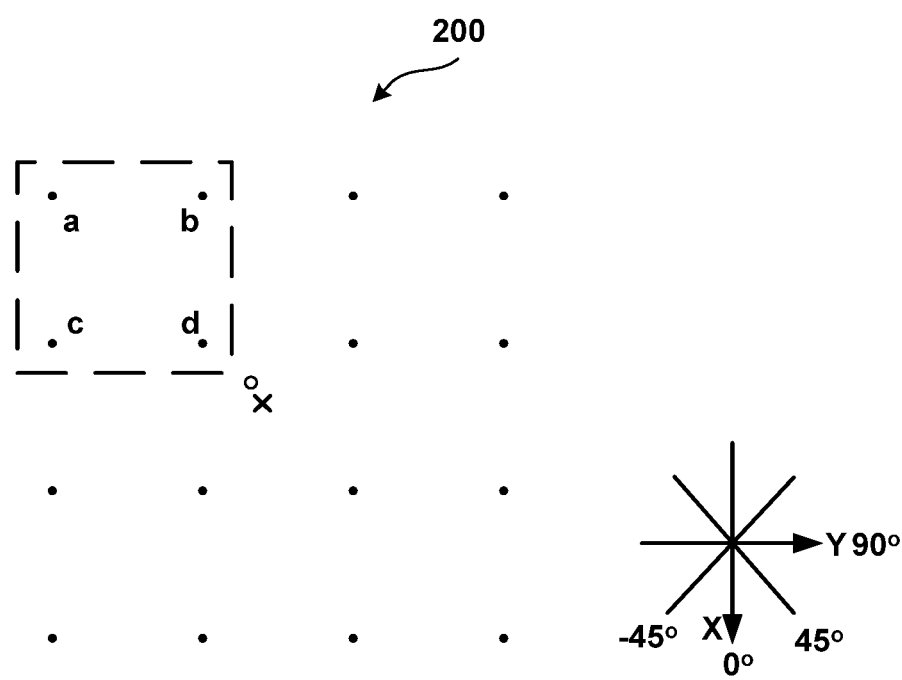
FIG. 5 is a schematic diagram of a plurality of pixels adjacent to an interpolation point according to an embodiment of the present application.

In some embodiments, the plurality of pixels adjacent to the interpolation point refer to a plurality of existing pixels substantially closest to the interpolation point in the pixel array, and these pixels usually form a square array. For example, as shown in FIG. 5, 4×4 pixels around the interpolation point X are selected for edge detection. It should be noted that, in other embodiments, more or fewer pixels may be used according to a specific application scenario in combination with a computation amount and a magnification.

Next, the plurality of pixels adjacent to the interpolation point are further divided into a plurality of pixel units. As shown in FIG. 5, pixels a, b, c and d form a pixel unit, and the pixels b and d further form another pixel unit with two other pixels on their right, the pixels c and d further form yet another pixel unit with the two other pixels below them, and so on. As a result, the 4×4 pixels in FIG. 5 can be divided into 3×3 pixels units. In this embodiment, each pixel unit includes four pixels. However, in other embodiments, according to the calculation amount and the selected number of pixels adjacent to the interpolation point, each pixel unit can alternatively include other number of pixels after division.

Next, in step S204b, for all pixel units, weight components of an edge direction in the plurality of preset edge directions are determined.

Generally, the more the preset edge directions are selected, the smoother the edge of the final output image is. However, the calculation amount also increases with the number of the preset edge directions as each preset edge direction needs a corresponding interpolation calculation method. In an embodiment, as shown in FIG. 5, selecting −45° direction, 0° direction, 45° direction and 90° direction as four preset edge directions can satisfy most application scenarios. It can be appreciated that, in other embodiments, six, eight or more preset edge directions can be used to make the edge of the output image smoother.

In order to calculate weight components of an edge direction of each of the plurality of pixel unit in the plurality of preset edge directions, an edge direction of each pixel unit is first calculated. Continue with FIG. 5 as an example, if a pixel depth of each pixel is 8 bits, that is, the grayscale value or each color depth value is represented by an 8-bit binary number, a tangent value of an edge direction angle A of the pixel unit abcd can be obtained using the following Equation (3):

$$\tan(A) = -128 \times (b+d-a-c)/(c+d-a-b) \quad \text{Equation (3):}$$

wherein a, b, c and d represent the pixel values of the corresponding pixels, so (b+d−a−c) represents a horizontal gradient of the pixel unit abcd, and (c+d−a−b) represents a vertical gradient of the pixel unit abcd. The coefficient −128 is determined based on the pixel depth of the pixels, and may vary in images with different color depths.

The edge direction angle A of the pixel unit abcd can be calculated according to the above-mentioned tangent value through an arctangent function. In a specific embodiment, the calculation can be made using the following Equation (4) which is an approximate function of the arc tangent function. It should be noted that Equation (4) only gives an input range from 0 to 1023, but since the function arctan(x) is origin-symmetric, for the inputs from −1023 to 0, the outputs can be obtained by directly taking the negative value of the outputs of their corresponding positive inputs. Therefore, Equation (4) applies to the input range from −1023 to 1023, and the output range is −256 to 256, and the corresponding angle is −90° to 90°.

$$\arctan(x) = \begin{cases} 138 \times x \gg 7 & (0 < x \leq 100) \\ 60 \times x + 7808 \gg 7 & (100 < x \leq 250) \\ 25 \times x + 16538 \gg 7 & (250 < x \leq 400) \\ 10 \times x + 22528 \gg 7 & (400 < x \leq 600) \\ 40 \times x + 16128 \gg 7 & (600 < x \leq 1023) \end{cases} \quad \text{Equation (4)}$$

wherein the operator ">>7" represents that the calculation result shifts rightward by 7 bits. It should be noted that, the constants in Equation (4) and the number of bits by which the calculation result shifts are related to pixel depths of the pixels, which may vary in different embodiments.

After obtaining the edge directions angles of the 9 pixel units in FIG. 5 using Equations (3) and (4), weight components of an edge direction of each pixel unit in the plurality of preset edge directions (for example, −45° direction, 0° direction, 45° direction and 90° direction) are calculated. In some embodiments, Equation (5) is used to calculate weight components of the edge direction of each pixel unit in the plurality of preset edge directions:

$$edg(i) = fw(|\arctan(x)-k|) \times edg\_deg \times vert\_coeff \times hori\_coeff \gg 23 \quad \text{Equation (5);}$$

wherein fw represents an approximate Gaussian function, arctan (x) corresponds to the edge direction of the current pixel unit, k corresponds to the preset edge direction currently used, and edg_deg represents a severity of edge changing of the pixel unit. Taking the pixel unit abcd in FIG. 5 as an example, its severity of edge changing is the greater one of |b+d−a−c| and |c+d−a−b|. The operator ">>23" represents that the calculation result shifts rightward by 23 bits, and vert_coeff and hori_coeff represent weight coefficients in vertical and horizontal directions respectively, which are determined according to the position of the current interpolation point.

In some embodiments, the weight coefficients vert_coeff and hori_coeff are obtained using Equation (2) in the above-mentioned polyphase interpolation algorithm. For example, corresponding to the 4×4 pixel array in FIG. 1, the weight components of 3×3 pixel units in a preset edge direction are taken as inputs, so as to calculate the weight coefficients vert_coeff and hori_coeff in the vertical and horizontal directions. In other embodiments, vert_coeff and hori_coeff may be calculated using other algorithms, but the basic idea is that the closer the pixel unit is to the interpolation point, the greater the weight is.

In some embodiments, the approximate Gaussian function is represented by Equation (6):

$$fw(x) = \begin{cases} 256 & (x = 0) \\ -19 \times x + 2014 \gg 3 & (0 < x \leq 50) \\ -8 \times x + 1440 \gg 3 & (50 < x \leq 150) \\ -2 \times x + 618 & (150 < x \leq 256) \\ 1 & (256 < x) \end{cases} \quad \text{Equation (6)}$$

wherein the operator ">>3" represents that the calculation result shifts rightward by 3 bits.

For different preset edge directions, the value of k in Equation (5) is different. According to the approximate arc tangent function of Equation (4), the output range is from −256 to 256 and the corresponding angle is from −90° to 90°. Thus, in this example, −128 corresponds to −45°, and k taking −128 in Equation (5) represents that a difference between the edge direction of the current pixel unit and the preset edge direction −45° is calculated. Similarly, the value of k corresponding to the preset edge direction 45° is 128, the value of k corresponding to the preset edge direction 0° is 0, and the value of k corresponding to the preset edge direction 90° is the smaller one of |arctan (x) −256| and |arctan (x)+256|. It should be understood by a person skilled in the art that the values of k, the constants and the number of shifting bits of the calculation result in Equations (5) and (6) are also related to pixel depths of the pixels, and may vary in different embodiments.

Next, in step S204c, based on the weight components of the edge direction of each of the plurality of pixel units in the plurality of preset edge directions, weights of the edge direction of the pixel array at the position of the interpolation point in the plurality of preset edge directions are determined.

In particular, since the weight components of all the 9 pixel units have been calculated in all the preset edge directions (that is, −45° direction, 0° direction, 45° direction and 90° direction) in foregoing step S204b, in step S204c, the weight of the edge direction of the pixel array at the position of the interpolation point in a certain preset edge direction can be obtained by adding the weight components of the 9 pixel units in the certain preset edge direction. In other words, after the calculation of the weight components corresponding to each pixel unit is completed, the results of all the pixel units need to be combined. From Equation (5), it can be seen that the weight of the pixel unit in the combination has two parts. First, the weight of the pixel unit is greater when the pixel unit is closer to the current interpolation point (that is, vert_coeff and hori_coeff are greater), and second, the weight of the pixel unit is greater when the pixel unit's severity of edge changing is greater (that is, edg_deg is greater); wherein a degree of each pixel unit close to the current interpolation point can be directly represented by a distance from a center of the pixel unit to the current interpolation point, and the severity of edge changing can be represented by the greater one of the gradient values of the pixel unit in two directions.

Taking FIG. 5 as an example, four weight values edg0, edg1, edg2 and edg3 of the edge direction of the pixel array 200 at the interpolation point X in the four preset edge directions −45°, 45°, 0° and 90° can be calculated and obtained in step S204c.

Returning to FIG. 2, the method proceed to step S206, for each of the plurality of preset edge directions, one or more corresponding pixel sub-arrays covering the interpolation point are selected from the pixel array to calculate an interpolation pixel value of the interpolation point.

In some embodiments, for each of the plurality of preset edge directions, the boundaries of the one or more corresponding pixel sub-arrays selected from the pixel array and covering the interpolation point form a parallelogram, and a first pair of opposite sides of the parallelogram is parallel to the preset edge direction. Compared with the existing method using only pixel sub-arrays in square areas or in rectangular areas for interpolation, the selection of pixel sub-arrays in the embodiments of the present application considers the angles of preset edge directions and includes a plurality of different shapes of pixel sub-arrays, which help to reduce jaggies.

Figure 6:
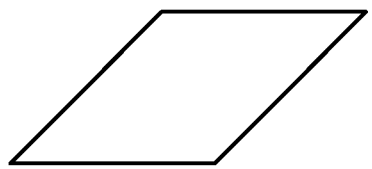
FIG. 6 is a schematic diagram of shapes of pixel sub-arrays selected from a pixel array according to an embodiment of the present application.
Figure 6:
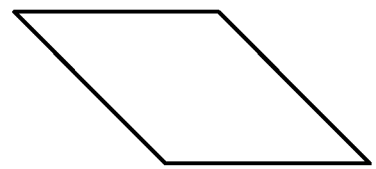
Figure 6:
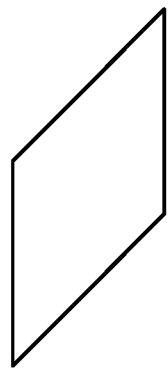
Figure 6:
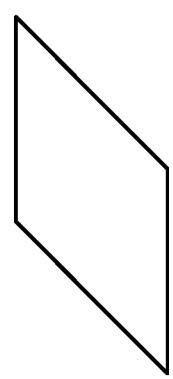
Figure 6:
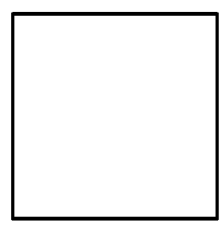
Figure 6:
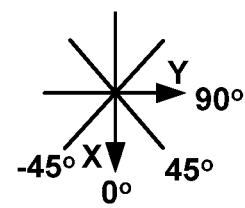

Continue with the example with the preset edge directions −45°, 0°, 45° and 90°, the selection of one or more corresponding pixel sub-arrays covering the interpolation point from the pixel array is described. For example, the pixel sub-arrays selected from the pixel array correspond to the five parallelograms shown in FIG. 6. The angled preset edge directions include −45° and 45°, which are relative to the horizontal direction, and for these two directions, two different kinds of pixel sub-arrays are required for the edge direction inclined to the horizontal direction and the edge direction inclined to the vertical direction. For example, pixel sub-arrays corresponding to the parallelograms of (a) and (c) in FIG. 6 are selected for the preset edge direction angle 45°. A pair of opposite sides of (a) and (c) are parallel to the preset edge direction i.e., also being 45°; and the other pair of opposite sides of (a) and (c) are respectively parallel to the horizontal and vertical directions. Similarly, pixel sub-arrays corresponding to the parallelograms of (b) and (d) in FIG. 6 are selected for the preset edge direction angle −45°. Pixel sub-arrays corresponding to the square of (e) in FIG. 6 are selected for the preset edge direction angles 0° and 90°.

Because when the angle of the preset edge direction is closer to the vertical direction, its corresponding pixel sub-arrays need to cover more rows in the vertical direction and more row memories are required, in some embodiments, only these four angles, −45°, 0°, 45°, and 90°, are used as the preset edge directions. Accordingly, pixel sub-arrays corresponding to the five parallelograms shown in FIG. 6 are selected. In other embodiments, when other numbers of edge directions are selected according to a specific application scenario, it is desired to select other pixel sub-arrays with suitable shapes. However, it should be noted that since the inputs in the interpolation calculation need to be uniformly distributed in the interpolation direction and are the pixels in the original image pixel array, the inclined sides of the parallelogram regions corresponding to the non-rectangular pixel sub-arrays need to pass through a pixel of each row/column in the input pixel array, otherwise the pixel itself input in the interpolation calculation process is a point to be interpolated. Therefore, the angles of the inclined sides of the non-rectangular pixel sub-arrays can only be arctan (n) and arctan (1/n), wherein n is an arbitrary integer.

After selecting corresponding pixel sub-arrays covering the interpolation point from the pixel array for each preset edge direction, an interpolation pixel value of the interpolation point can be calculated based on the selected pixel sub-arrays. Specifically, in each pixel sub-array, interpolation pixel values of pixels of each row or column at positions corresponding to the position of the interpolation point are calculated in the direction of the second pair of opposite sides which is different from the abovementioned first pair of opposite sides of the parallelogram. The interpolation pixel value of the interpolation point is calculated based on the interpolation pixel values of pixels of each row or column at the positions corresponding to the position of the interpolation point. The positions corresponding to the position of the interpolation point refer to the positions at the intersections of a straight line passing through the interpolation point in the preset edge direction and the row or column.

Figure 7:
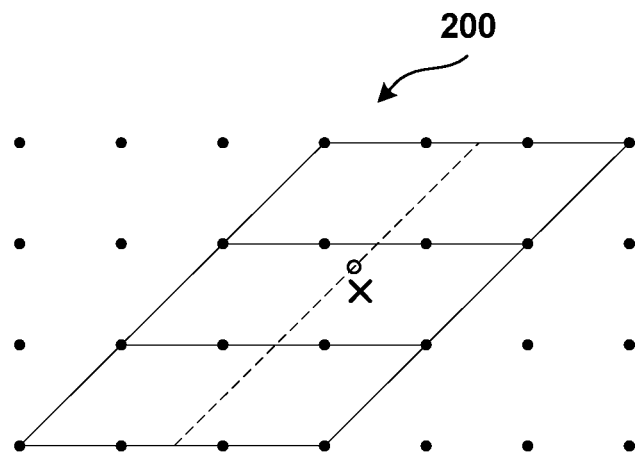
FIG. 7 is a schematic diagram of calculating an interpolation pixel value of an interpolation point based on pixel sub-arrays according to an embodiment of the present application.
Figure 7:
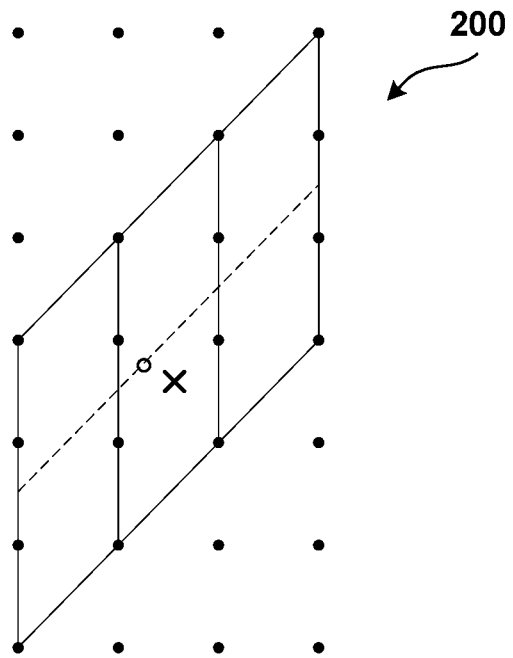

Referring to FIG. 7 (a), a pixel sub-array corresponding to the parallelogram shown in FIG. 6 (a) is shown, wherein a straight line passing through the interpolation point in the preset edge direction (shown with dashed lines in FIG. 7 (a)) intersects with four rows of the pixel sub-array. First, horizontal interpolation results at the intersection positions of the four rows of pixels and the straight line are calculated, and then the interpolation pixel value at the position of the interpolation point of the straight line is calculated using the four horizontal interpolation results. Correspondingly, referring to FIG. 7 (b), corresponding to the parallelogram-shaped pixel sub-array shown in FIG. 6 (c), a straight line passing through the interpolation point in the preset edge direction (shown with dashed lines in FIG. 7 (b)) intersects with four columns of the pixel sub-array. First, the vertical interpolation results at the intersection positions of the four columns of pixels and the straight line are calculated, and then the interpolation pixel value at the position of the interpolation point of the straight line is calculated using the four vertical interpolation results. The calculation of the other three pixel sub-arrays is similar, and will not be described in detail herein. After calculation, the interpolation pixel values corresponding to the five pixel sub-arrays shown in FIG. 6 can be obtained.

Continuing with FIG. 2 and proceeding to step S208, a weighted interpolation pixel value of the interpolation point is calculated based on the weights of the edge direction of the pixel array at the position of the interpolation point in the plurality of preset edge directions and the interpolation pixel value of the interpolation point corresponding to each of the plurality of preset edge directions.

In step S204 and step S206, the weights of the edge direction of the pixel array at the position of the interpolation point in the plurality of preset edge directions and the interpolation pixel value of the interpolation point corresponding to each preset edge direction are respectively calculated, then the weighted interpolation pixel value of the interpolation point can be obtained after weighted combination of the abovementioned results.

Specifically, in some embodiments, a weight of the interpolation pixel value corresponding to each pixel sub-array is first calculated based on the weights of the edge direction of the pixel array at the position of the interpolation point in the plurality of preset edge directions. Next, a weighted interpolation pixel value of the interpolation point is calculated based on the interpolation pixel values of all the pixel sub-arrays and their corresponding weights.

Continuing with the example with the preset edge directions −45°, 0°, 45°, and 90°, the weight of the interpolation pixel value corresponding to each pixel sub-array in FIG. 6 can be calculated using Equation (7):

$$\begin{cases} wedg = f\left(256 \times \frac{edg0}{edg0 + edg1}, thr\right) \times \\ \quad f\left(256 \times \frac{edg2}{edg2 + edg3}, thr\right) \\ w5 = 256 - wedg \\ w1 = (edg0 \times edg2)/(edg1 \times edg3) \\ w2 = (edg1 \times edg2)/(edg0 \times edg3) \\ w3 = (edg0 \times edg3)/(edg1 \times edg2) \\ w4 = (edg1 \times edg3)/(edg0 \times edg2) \end{cases} \quad \text{Equation (7)}$$

wherein edg0, edg1, edg2 and edg3 represent four weight values of the edge direction of the pixel array at the interpolation point in the four preset edge directions −45°, 45°, 0° and 90°; and w1, w2, w3 and w4 and w5 are the weight values of the interpolation pixel values corresponding to all pixel sub-arrays in FIG. 5.

$$f(x) = \qquad \text{Equation (8)}$$
$$\begin{cases} 32768 - (256 - thr) \times x \gg 7 & (0 < x \le 128) \\ (256 - thr) \times x + 256 \times thr - 32768 \gg 7 & (128 < x \le 256) \end{cases}$$

The function of Equation (8) is that when a difference between two inputs edg0 and edg1 (or edg2 and edg3) is smaller, the output of f(x) is smaller; when the two inputs are the same, the output of f(x) is thr; and when the difference between the two inputs is greater, the output of f(x) is greater. The larger thr is, the greater the output of f(x) is, and the greater the weight of the interpolation pixel value calculated based on the edge direction is, i.e., the greater the weight of the interpolation pixel value calculated based on the non-square-shape pixel sub-array is. Therefore, the parameter thr actually controls whether the final weighted interpolation pixel value is more dependent on the edge direction or more related to the conventional polyphase interpolation algorithm. In some embodiments, when the value of thr is 128, a preferable effect can be obtained.

It can be seen that wedg is the sum of the weights of the interpolation pixel values corresponding to (a), (b), (c) and (d) in FIG. 6. The idea is that, if it is calculated in step S204 that the edge direction of the pixel array at the position of the current interpolation point inclines to the directions of ±45° or to the directions of 0/90° significantly, it indicates that the estimation for the edge direction is inaccurate, and the interpolation pixel value obtained by the calculation through (e) in FIG. 6 is preferred. On the other hand, when the estimation for the edge direction is accurate, the interpolation pixel value obtained by the calculation through (a), (b), (c) and (d) in FIG. 6 are preferably used. Therefore, wedg is calculated and assigned to w1, w2, w3 and w4 corresponding to (a), (b), (c) and (d) in FIG. 6, and the remaining weight is assigned to w5 corresponding to (e) in FIG. 6. The edge direction suitable for the pixel sub-array corresponding to w1 is between −45° and −0°, so its weight can be obtained through dividing the weights of −45° and −0° (edg0 and edg2) by the weights of 45° and 90° (edg1 and edg3). The calculation methods of w2, w3 and w4 are similar, and will not be described in detail herein.

Afterwards, the weighted interpolation pixel value of the interpolation point is calculated by Equation (9) based on the interpolation pixel values of all the pixel sub-array and the weights of the interpolation pixel values:

$$OUT=(wedg) \times (w1 \times out1+w2 \times out2+w3 \times out3+w4 \times out4)/(w1+w2+w3+w4)+w5 \times out5 >> 8 \quad \text{Equation (9)}$$

wherein OUT represents the weighted interpolation pixel value of the interpolation point, and the operator ">>8" represents that the result shifts rightward by 8 bits.

Although step S208 has been described above with reference to the example with the preset edge directions −45°, 45°, 0° and 90°, it should be understood that its calculation idea is applicable to other preset edge directions as well. In other words, the weight of the interpolation pixel value corresponding to a pixel sub-array depends positively on the proximity of the edge direction of the pixel array at the position of the interpolation point to a preset edge direction corresponding to the pixel sub-array. However, since there may be some errors in edge direction detection for complicated image regions and noisy regions, it is desirable to increase the weights of the interpolation pixel values obtained by using the non-rectangular pixel sub-arrays only in the regions where the results of edge direction detection are more reliable. More interpolation pixel values obtained by using rectangular or square pixel sub-arrays can be used for regions where the results of edge direction detection are less reliable. Since the edge direction detection result shows the proximity of the real edge direction to each preset edge direction, that is, the detection results are the weights relative to each preset edge direction, it can be deemed that the real edge direction is between the two preset edge directions with the largest weights. Therefore, the weight corresponding to the interpolation pixel value of each pixel sub-array can be obtained by multiplying the weight of the corresponding preset edge direction by the weight of the adjacent preset edge direction with a larger weight, and then dividing the product by the weights of other preset edge directions. Finally, all weights are normalized as coefficients of the interpolation pixel values. It should be noted that, although the above weight calculation strategy can be applied to different numbers of preset edge directions, the weight calculation strategy may be optimized in order to obtain better results when different numbers of preset edge directions are selected.

Figure 8:
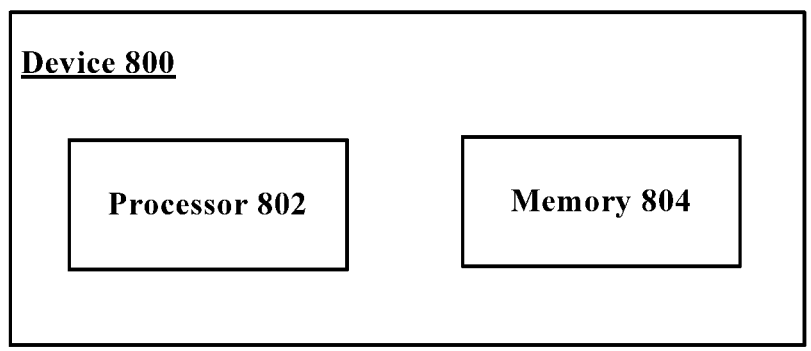
FIG. 8 is a schematic diagram of a device for interpolating an image according to an embodiment of the present application.

Referring to FIG. 8, FIG. 8 is a schematic diagram of a device 800 for interpolating an image according to an embodiment of the application. In some embodiments, the device can be used to interpolate the image including the pixel array formed of a plurality of pixels as shown in FIG. 3.

As shown in FIG. 8, device 800 includes: a processor 802 and a memory 804; the memory 802 stores program instructions that are executable by the processor 804, and when executed by the processor 804, the processor 804 is enabled to perform following steps: determining a position of an interpolation point relative to the pixel array; determining weights of an edge direction of the pixel array at the position of the interpolation point in a plurality of preset edge directions based on pixel values of a plurality of pixels adjacent to the interpolation point; selecting, for each of the plurality of preset edge directions, one or more corresponding pixel sub-arrays covering the interpolation point from the pixel array to calculate an interpolation pixel value of the interpolation point; and calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions.

In some embodiments, determining weights of an edge direction of the pixel array at the position of the interpolation point in a plurality of preset edge directions based on pixel values of a plurality of pixels adjacent to the interpolation point, includes: dividing the plurality of pixels adjacent to the interpolation point into a plurality of pixel units; calculating weight components of an edge direction of each of the plurality of pixel units in the plurality of preset edge directions; and determining weights of the edge direction of the pixel array at the position of the interpolation point in the plurality of preset edge directions based on the weight components of the edge direction of each of the plurality of pixel units in the plurality of preset edge directions.

In some embodiments, the weight components of the edge direction of the pixel unit in the plurality of preset edge directions are related to a distance from the pixel unit to the position of the interpolation point, and a severity of edge changing of the pixel unit.

In some embodiments, the plurality of preset edge directions include a −45° direction, a 0° direction, a 45° direction and a 90° direction.

In some embodiments, for each of the plurality of preset edge directions, boundaries of the one or more corresponding pixel sub-arrays covering the interpolation point selected from the pixel array form a parallelogram with its first pair of opposite sides parallel to the preset edge direction.

In some embodiments, selecting, for each of the plurality of preset edge directions, one or more corresponding pixel sub-arrays covering the interpolation point from the pixel array to calculate an interpolation pixel value of the interpolation point, includes: calculating, in each of the pixel sub-arrays, interpolation pixel values of pixels of each row or column at positions corresponding to the position of the interpolation point in a direction of a second pair of opposite sides different from the first pair of opposite sides of the parallelogram, wherein the positions corresponding to the position of the interpolation point are at respective intersections of a straight line passing through the interpolation point in the preset edge direction and the row or column; and calculating the interpolation pixel value of the interpolation point based on the interpolation pixel values of pixels of each row or column at the positions corresponding to the position of the interpolation point.

In some embodiments, calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions, includes: calculating a weight of the interpolation pixel value corresponding to each pixel sub-array based on the weights of the edge direction of the pixel array at the position of the interpolation point in the plurality of preset edge directions of the pixel array; and calculating the weighted interpolation pixel value of the interpolation point based on the interpolation pixel value of each pixel sub-array and the weight of the interpolation pixel value.

It should be noted that although several steps of a method for interpolating an image and several modules of a device for interpolating an image are mentioned in the foregoing detailed description, such a division is merely exemplary and not mandatory. In fact, according to the embodiments of the present application, features and functions of two or more modules described above can be embodied in one module. Conversely, features and functions of one module described above can be further divided to be embodied in a plurality of modules.

A person skilled in the art may, upon studying the specification, the disclosure, the drawings and the appended claims, understand and practice other changes to the disclosed embodiments. In the claims, the word "comprising" does not exclude other elements and steps, and the expressions "a" and "an" do not exclude the plural. In the practical application of the present application, a part may perform functions of multiple technical features cited in the claims. Any reference signs in the claims should not be understood as limiting the scope.

What is claimed is:

1. A method for interpolating an image, the method comprising:

obtaining the image from a memory, the image comprising a pixel array formed of a plurality of pixels;

determining a need to enlarge the image;

determining a position of an interpolation point relative to the pixel array in response to the need to enlarge the image;

determining weights of an edge direction of the pixel array at the position of the interpolation point in a plurality of preset edge directions, based on pixel values of a plurality of pixels adjacent to the interpolation point;

selecting, for each of the plurality of preset edge directions, one or more corresponding pixel sub-arrays covering the interpolation point from the pixel array to calculate an interpolation pixel value of the interpolation point corresponding to this preset edge, wherein each of the one or more corresponding pixel sub-arrays comprises more than one pixel;

calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions; and forming an enlarged image by combining the interpolation point having the weighted interpolation pixel value with the pixel array of the image obtained, such that jaggies can be reduced from the enlarged image, wherein determining weights of an edge direction of the pixel array at the position of the interpolation point in a plurality of preset edge directions based on pixel values of a plurality of pixels adjacent to the interpolation point, comprising:

dividing the plurality of pixels adjacent to the interpolation point into a plurality of pixel units;

calculating, for each of the plurality of pixel units, weight components of an edge direction in the plurality of preset edge directions; and determining weights of the edge direction of the pixel array at the position of the interpolation point in the plurality of preset edge directions based on the weight components of the edge direction of each of the plurality of pixel units in the plurality of preset edge directions.

2. The method of claim 1, wherein the weight components of the edge direction of the pixel unit in the plurality of preset edge directions are related to a distance from the pixel unit to the position of the interpolation point, and a severity of edge changing of the pixel unit.

3. The method of claim 1, wherein the plurality of preset edge directions comprise a −45° direction, a 0° direction, a 45° direction and a 90° direction.

4. The method of claim 1, wherein for each of the plurality of preset edge directions, boundaries of the one or more corresponding pixel sub-arrays covering the interpolation point selected from the pixel array form a parallelogram with its first pair of opposite sides parallel to the preset edge direction.

5. The method of claim 4, wherein selecting, for each of the plurality of preset edge directions, one or more corresponding pixel sub-arrays covering the interpolation point from the pixel array to calculate an interpolation pixel value of the interpolation point, comprising:

calculating, in each of the pixel sub-arrays, interpolation pixel values of pixels of each row or column at positions corresponding to the position of the interpolation point in a direction of a second pair of opposite sides different from the first pair of opposite sides of the parallelogram, wherein the positions corresponding to the position of the interpolation point are at respective intersections of a straight line passing through the interpolation point in the preset edge direction and the row or column; and calculating the interpolation pixel value of the interpolation point based on the interpolation pixel values of pixels of each row or column at the positions corresponding to the position of the interpolation point.

6. The method of claim 1, wherein calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions, comprising:

calculating a weight of the interpolation pixel value corresponding to each pixel sub-array based on the weights of the edge direction of the pixel array at the position of the interpolation point in the plurality of preset edge directions; and calculating the weighted interpolation pixel value of the interpolation point based on the interpolation pixel values of all the pixel sub-arrays and the weights of these interpolation pixel values.

7. A device for interpolating an image, the device comprising:

a processor;

a memory, wherein the memory stores the image, the image comprising a pixel array formed of a plurality of pixels, and stores program instructions that are executable by the processor, and when executed by the processor, the program instructions cause the processor:

obtaining the image from the memory;

determining a need to enlarge the image;

determining a position of an interpolation point relative to the pixel array in response to the need to enlarge the image;

determining weights of an edge direction of the pixel array at the position of the interpolation point in a plurality of preset edge directions based on pixel values of a plurality of pixels adjacent to the interpolation point;

selecting, for each of the plurality of preset edge directions, one or more corresponding pixel sub-arrays covering the interpolation point from the pixel array to calculate an interpolation pixel value of the interpolation point, wherein each of the one or more corresponding pixel sub-arrays comprises more than one pixel;

calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions; and forming an enlarged image by combining the interpolation point having the weighted interpolation pixel value with the pixel array of the image obtained, such that jaggies can be reduced from the enlarged image, wherein determining weights of an edge direction of the pixel array at the position of the interpolation point in a plurality of preset edge directions based on pixel values of a plurality of pixels adjacent to the interpolation point, comprising:

dividing the plurality of pixels adjacent to the interpolation point into a plurality of pixel units;

calculating, for each of the plurality of pixel units, weight components of an edge direction in the plurality of preset edge directions; and determining weights of the edge direction of the pixel array at the position of the interpolation point in the plurality of preset edge directions based on the weight components of the edge direction of each of the plurality of pixel units in the plurality of preset edge directions.

8. The device of claim 7, wherein the weight components of the edge direction of the pixel unit in the plurality of preset edge directions are related to a distance from the pixel unit to the position of the interpolation point, and a severity of edge changing of the pixel unit.

9. The device of claim 7, wherein the plurality of preset edge directions comprise a −45° direction, a 0° direction, a 45° direction and a 90° direction.

10. The device of claim 7, wherein for each of the plurality of preset edge directions, boundaries of the one or more corresponding pixel sub-arrays covering the interpolation point selected from the pixel array form a parallelogram with its first pair of opposite sides parallel to the preset edge direction.

11. The device of claim 10, wherein selecting, for each of the plurality of preset edge directions, one or more corresponding pixel sub-arrays covering the interpolation point from the pixel array to calculate an interpolation pixel value of the interpolation point, comprising:

calculating, in each of the pixel sub-arrays, interpolation pixel values of pixels of each row or column at positions corresponding to the position of the interpolation point in a direction of a second pair of opposite sides different from the first pair of opposite sides of the parallelogram, wherein the positions corresponding to the position of the interpolation point are at respective intersections of a straight line passing through the interpolation point in the preset edge direction and the row or column; and calculating the interpolation pixel value of the interpolation point based on the interpolation pixel values of pixels of each row or column at the positions corresponding to the position of the interpolation point.

12. The device of claim 7, wherein calculating a weighted interpolation pixel value of the interpolation point based on the weights of the edge direction of the pixel array at the position of the interpolation point in the plurality of preset edge directions and the interpolation pixel value of the interpolation point corresponding to each of the plurality of preset edge directions, comprising:

calculating a weight of the interpolation pixel value corresponding to each pixel sub-array based on the weights of the edge direction of the pixel array at the position of the interpolation point in the plurality of preset edge directions of the pixel array; and calculating the weighted interpolation pixel value of the interpolation point based on the interpolation pixel values of all the pixel sub-arrays and the weights of the interpolation pixel values.

\* \* \* \* \*